United States Patent
Nanba et al.

(10) Patent No.: US 7,291,675 B2
(45) Date of Patent: Nov. 6, 2007

(54) GOLF BALL RUBBER COMPOSITIONS AND GOLF BALLS

(75) Inventors: Atsushi Nanba, Chichibu (JP); Jun Shindo, Chichibu (JP)

(73) Assignee: Bridgestone Sports Co., Ltd., Tokyo (JP)

( * ) Notice: Subject to any disclaimer, the term of this patent is extended or adjusted under 35 U.S.C. 154(b) by 296 days.

(21) Appl. No.: 11/067,921

(22) Filed: Mar. 1, 2005

(65) Prior Publication Data

US 2006/0199936 A1  Sep. 7, 2006

(51) Int. Cl.
  *C08L 9/00* (2006.01)
  *C08L 77/00* (2006.01)
  *A63B 37/06* (2006.01)
  *A63B 37/00* (2006.01)

(52) U.S. Cl. .......................... 525/90; 525/179; 525/193; 473/371; 473/372

(58) Field of Classification Search ...................... None
See application file for complete search history.

(56) References Cited

U.S. PATENT DOCUMENTS 6,846,879 B2  1/2005  Iwami

2003/0073784 A1*  4/2003  Ohama ........................ 525/261
2003/0114251 A1  6/2003  Fushihara et al.

FOREIGN PATENT DOCUMENTS

| JP | 7-48477 A | 2/1995 |
| JP | 2003-180870 A | 7/2003 |
| JP | 2003-210615 A | 7/2003 |

* cited by examiner

*Primary Examiner*—David J. Buttner
(74) *Attorney, Agent, or Firm*—Sughrue Mion, PLLC

(57) ABSTRACT

A rubber composition for a one-piece golf ball or for a solid core of a solid golf ball having a multilayer construction in which the core is enclosed directly, or with an intermediate layer, by a cover includes (a) 100 parts by weight of a base rubber, (b) 10 to 60 parts by weight of a co-crosslinking agent, (c) 5 to 80 parts by weight of an inorganic filler, (d) 0.1 to 5 parts by weight of an organic peroxide, (e) 0.05 to 5 parts by weight of an organosulfur compound, (f) 0.05 to 5 parts by weight of sulfur, and (g) 1 to 10 parts by weight of a binary copolymer consisting of a polyolefin component and a polyamide component. Golf ball rubber compositions and golf balls made using such compositions have a good resilience and excellent durability.

9 Claims, No Drawings

GOLF BALL RUBBER COMPOSITIONS AND GOLF BALLS

BACKGROUND OF THE INVENTION

The present invention relates to materials for one-piece golf balls and to core materials for solid golf balls such as two-piece golf balls and three-piece golf balls. More specifically, the invention relates to golf ball rubber compositions and golf balls having a good resilience and excellent durability.

To provide golf balls with an excellent rebound and a softer core, various improvements have been made in the polybutadiene formulations used as the base rubber. However, simply making the core softer compromises the durability of the ball to cracking with repeated impact.

To address this concern, JP-A 7-48477 describes a rubber composition for two-piece golf balls in which amide group-bearing microfibers or fine particles are used. JP-A 2003-180870 and JP-A 2003-210615 disclose the incorporation, within a rubber composition for a golf ball core, of an olefin resin and a rubber/polyolefin/polyamide (nylon) three-component complex.

However, even with these improvements, the golf ball core itself lacks sufficient durability.

The object of the invention is to provide golf ball rubber compositions of good resilience and excellent durability, and golf balls formed using such compositions.

SUMMARY OF THE INVENTION

We have conducted extensive investigations, as a result of which we have found that by using a material molded under heat from a rubber composition which includes (a) 100 parts by weight of a base rubber, (b) 10 to 60 parts by weight of a co-crosslinking agent, (c) 5 to 80 parts by weight of an inorganic filler, (d) 0.1 to 5 parts by weight of an organic peroxide, (e) 0.05 to 5 parts by weight of an organosulfur compound, (f) 0.05 to 5 parts by weight of sulfur, and (g) 1 to 10 parts by weight of a binary copolymer consisting of a polyolefin component and a polyamide component in solid golf balls such as one-piece, two-piece or three-piece golf balls, either as a one-piece golf ball material or as a core material, the binary copolymer composed of a polyolefin component and a polyamide component in particular acts in synergy with the base rubber and the other components to confer the hot-molded material with a good resilience and excellent durability.

Accordingly, the invention provides the following rubber compositions for golf balls and the following golf balls.

[1] A rubber composition for a one-piece golf ball or for a solid core of a solid golf ball having a multilayer construction in which the core is enclosed directly, or with an intermediate layer, by a cover, which rubber composition is characterized by including (a) 100 parts by weight of a base rubber, (b) 10 to 60 parts by weight of a co-crosslinking agent, (c) 5 to 80 parts by weight of an inorganic filler, (d) 0.1 to 5 parts by weight of an organic peroxide, (e) 0.05 to 5 parts by weight of an organosulfur compound, (f) 0.05 to 5 parts by weight of sulfur, and (g) 1 to 10 parts by weight of a binary copolymer consisting of a polyolefin component and a polyamide component.

[2] The golf ball rubber composition of [1] above, wherein component (g) has a polyolefin component/polyamide component weight ratio of 25/75 to 95/5.

[3] A one-piece golf ball characterized by being molded from the rubber composition of [1] or [2] above.

[4] A solid golf ball having a multilayer construction comprising a solid core enclosed directly, or with an intermediate layer, by a cover, which multilayer solid golf ball is characterized in that the solid core is made of the rubber composition of [1] or [2] above.

DETAILED DESCRIPTION OF THE INVENTION

The invention is described more fully below. In the inventive rubber compositions for golf balls, a rubber composition obtained by compounding aforementioned components (a) to (g) is employed as a material for one-piece golf balls or as a solid core material for two-piece solid golf balls or multi-piece solid golf balls having three or more layers.

The base rubber (a) is preferably one which is composed primarily of polybutadiene. Together with the polybutadiene, the base rubber (a) may also include other rubbers such as natural rubber, polyisoprene rubber and styrene-butadiene rubber. "Composed primarily of polybutadiene" signifies herein that the proportion of polybutadiene in the base rubber is at least 50 wt %, preferably at least 70 wt %, and most preferably 100 wt %.

The polybutadiene has a cis-1,4 content of at least 60%, preferably at least 80%, more preferably at least 90%, and most preferably at least 95%, and has a 1,2-vinyl content of 2% or less, preferably 1.7% or less, more preferably 1.5% or less, and most preferably 1.3% or less. Outside of the above ranges, the resilience decreases.

The polybutadiene can be synthesized with a rare-earth catalyst, specifically a neodymium catalyst, or another type of metal catalyst such as a cobalt catalyst or nickel catalyst.

Examples of the co-crosslinking agent (b) include unsaturated carboxylic acids and the metal salts of unsaturated carboxylic acids.

Specific unsaturated carboxylic acids include acrylic acid, methacrylic acid, maleic acid and fumaric acid. The use of acrylic acid or methacrylic acid is especially preferred.

No particular limitation is imposed on the metal salts of unsaturated carboxylic acids. Examples include any of the above-mentioned unsaturated carboxylic acids neutralized with a desired metal ion. Specific examples include the zinc and magnesium salts of methacrylic acid and acrylic acid. Zinc acrylate is especially preferred.

The amount of unsaturated carboxylic acid and/or metal salt included per 100 parts by weight of the base rubber is generally at least 10 parts by weight, preferably at least 15 parts by weight, and more preferably at least 20 parts by weight, but generally not more than 60 parts by weight, preferably not more than 50 parts by weight, more preferably not more than 45 parts by weight, and most preferably not more than 40 parts by weight. Too much may make the rubber composition too hard and give the golf ball an unpleasant feel upon impact, whereas too little may lower the rebound.

Preferred examples of the inorganic filler (c) include zinc oxide, barium sulfate, calcium carbonate and silica. Any one or combination of two or more thereof may be used.

The amount of inorganic filler included per 100 parts by weight of the base rubber is generally at least 1 part by weight, and preferably at least 5 parts by weight, but generally not more than 50 parts by weight, preferably not more than 40 parts by weight, more preferably not more than 30 parts by weight, and most preferably not more than 20 parts by weight. Too much or too little inorganic filler may make it impossible to achieve a suitable weight and a desirable rebound.

Preferred examples of the organic peroxide (d) include dicumyl peroxide and 1,1-bis(t-butylperoxy)cyclohexane. Preferred examples include Percumyl D (NOF Corporation), Perhexa 3M (NOF Corporation) and Luperco 231XL (Atochem Co.) Any one or combination of two or more thereof may be used.

The amount of organic peroxide included per 100 parts by weight of the base rubber is generally at least 0.1 part by weight, preferably at least 0.3 part by weight, more preferably at least 0.5 part by weight, and most preferably at least 0.7 part by weight, but generally not more than 5 parts by weight, preferably not more than 4 parts by weight, even more preferably not more than 3 parts by weight, and most preferably not more than 2 parts by weight. Too much or too little organic peroxide may make it impossible to achieve a good feel on impact, and good durability and rebound.

If necessary, an antioxidant may be included in the rubber composition. Examples of suitable commercial antioxidants include Nocrac NS-6, Nocrac NS-30 (both available from Ouchi Shinko Chemical Industry Co., Ltd.) and Yoshinox 425 (available from Yoshitomi Pharmaceutical Industries, Ltd.). Any one or combinations of two or more thereof may be used.

The amount of antioxidant included per 100 parts by weight of the base rubber is 0 or more part by weight, preferably at least 0.05 part by weight, more preferably at least 0.1 part by weight, and most preferably at least 0.2 part by weight, but generally not more than 3 parts by weight, preferably not more than 2 parts by weight, more preferably not more than 1 part by weight, and most preferably not more than 0.5 part by weight. Too much or too little antioxidant may make it impossible to achieve a desirable rebound and durability.

The organosulfur compound (e) is included to enhance the rebound and increase the initial velocity of the golf ball. The organosulfur compound is not subject to any particular limitation so long as it enhances the resilience of the golf ball. Exemplary organosulfur compounds include thiophenols, thionaphthols, halogenated thiophenols, and metal salts of any of these, as well as polysulfides having 2 to 4 sulfurs. Specific examples of preferred organosulfur compounds include pentachlorothiophenol, pentafluorothiophenol, pentabromothiophenol, p-chlorothiophenol, the zinc salt of pentachlorothiophenol, the zinc salt of pentafluorothiophenol, the zinc salt of pentabromothiophenol, the zinc salt of p-chlorothiophenol, diphenylpolysulfides having 2 to 4 sulfurs, dibenzylpolysulfide, dibenzoylpolysulfide, dibenzothiazoylpolysulfide and dithiobenzoylpolysulfide. The zinc salt of pentachlorothiophenol and diphenyldisulfide are especially preferred.

It is recommended that the amount of organosulfur compound included per 100 parts by weight of the base rubber be generally at least 0.05 part by weight, and preferably at least 0.1 part by weight, but generally not more than 5 parts by weight, preferably not more than 4 parts by weight, more preferably not more than 3 parts by weight, and most preferably not more than 2.5 parts by weight. With the addition of too much organosulfur compound, the effects may reach an upper limit beyond which additional organosulfur compound has no further effect. On the other hand, a sufficient effect may not be achieved with the addition of too little organosulfur compound.

The sulfur (f) is used as an essential additive to suitably adjust the hardness distribution. This sulfur may be in the form of a powder, such as the dispersible sulfur produced by Tsurumi Chemical Industry Co., Ltd. under the trade name designation Sulfur Z.

The amount of sulfur (f) included per 100 parts by weight of the base rubber is from 0.05 to 5 parts by weight, preferably from 0.1 to 3 parts by weight, and more preferably from 0.1 to 1 part by weight. If too little sulfur is included, it may not be possible to achieve a solid core hardness distribution above a certain level, as a result of which the rebound resilience may be lower and the distance traveled by the ball shorter. On the other hand, too much sulfur may give rise to undesirable effects, such as explosion of the rubber composition during molding under applied heat.

Component (g) is a binary copolymer consisting of a polyolefin component and a polyamide component. Including such a binary copolymer in the inventive rubber composition enables the durability of the one-piece golf ball or core as a whole to be improved.

Illustrative examples of the polyolefin component in component (g) include low-density polyethylene (LDPE), high-density polyethylene (HDPE), polypropylene and polystyrene. Of these, polyethylene and highly crystalline, low-density polyethylene are preferred.

Illustrative examples of the polyamide component in component (g) include nylon 6, nylon 66, nylon 11, nylon 12, nylon 610, nylon 612, copolymeric nylon, nylon MXD6, nylon 46, aramids, polyamide-imides and polyimides. Nylon 6 is preferred because of the good balance it provides between properties and cost. It is advantageous for nylon fibers to be used as the polyamide component, with nylon fibers having an average diameter of 10 μm or less, preferably 5 μm or less, and more preferably 1 μm or less, but at least 0.01 μm being desirable to elicit an effective reinforcing effect for the amount of addition thereof. "Average diameter" refers here to a measured value obtained by the cross-sectional examination of samples using a transmission electron microscope.

It is particularly advantageous for component (g) in the invention to be of a form in which a crystalline polyolefin component is bonded to the surface of the nylon fibers. Here, "bonded" signifies graft bonding between the polyamide component and the polyolefin component by the addition of a binder. Examples of binders that may be used for this purpose include silane coupling agents, titanate coupling agents, unsaturated carboxylic acids, unsaturated carboxylic acid derivatives and organic peroxides.

In component (g), it is advantageous for the weight ratio of the polyolefin component (g-1) to the polyamide component (g-2), expressed as (g-1)/(g-2), to be from 25/75 to 95/5, preferably from 30/70 to 90/10, and more preferably from 40/60 to 75/25. With too little polyamide component, adequate effects may not be achieved. On the other hand, with too much polyamide component, proper mixing may not take place when component (g) is blended with component (a) in an apparatus such as a twin-screw extruder.

The weight ratio of component (a) to component (g), expressed as (a)/(g), is from 100/1 to 100/10, preferably from 100/1 to 100/7, and more preferably from 100/2 to 100/5. If too little component (g) is included, adequate effects may not be achieved. On the other hand, too much component (g) may make the rubber composition difficult to knead or difficult mold into a golf ball cover.

To maintain the shape of the polyamide component as much as possible, it is advantageous, though not essential, for the temperature at which components (a) and (g) are blended together to be at least the melting point of the polyolefin component, and preferably at least 10° C. above the melting point of the polyolefin component, but not higher than the melting point of the polyamide component, and preferably not higher than 10° C. below the melting point of the polyamide component.

The rubber composition is worked in a suitable apparatus such as a roll mill, kneader or Banbury mixer, then molded under heat and pressure within a mold to produce a one-piece golf ball or a solid core for a multi-piece solid golf ball. Vulcanization and molding may be carried out under normal conditions. For example vulcanization may be carried out at a temperature of 100 to 200° C. for a period of 10 to 40 minutes. When a solid golf ball having a multilayer construction, such as a two-piece ball, is produced, the solid core made of the above rubber composition is enclosed directly, or with an intermediate layer, by a cover. Preferred use can be made of a conventional cover material such as ionomer resin, polyester, polyurethane or nylon to make the mantle and cover.

The material molded under heat from the above rubber composition has a deflection, when subjected to a load of 980 N (100 kg), which may be suitably selected according to the type of golf ball desired, although it is recommended that the deflection be generally at least 2.0 mm, preferably at least 2.5 mm, and more preferably at least 2.8 mm, but not more than 6.0 mm, preferably not more than 5.5 mm, and more preferably not more than 5.0 mm. Too small a deflection may worsen the feel of the ball upon impact and, particularly on long shots such as with a driver in which the ball incurs a large deformation, may subject the ball to an excessive rise in spin, reducing the carry. On the other hand, too large a deflection may deaden the feel of the ball when hit and give the ball an insufficient rebound that shortens the distance traveled, and also may worsen the durability of the ball to cracking from repeated impact.

The golf ball of the invention includes as an essential feature a material that has been molded under heat from the above-described rubber composition, although the construction of the ball is not subject to any particular limitation. Examples of suitable golf ball constructions include one-piece golf balls in which the hot-molded material itself is used directly as the golf ball, two-piece solid golf balls wherein the hot-molded material serves as a solid core on the surface of which a cover has been formed, and multi-piece solid golf balls made of three or more pieces in which the hot-molded material serves as a solid core over which a cover composed of two or more layers has been formed.

The golf ball of the invention can be produced for competitive play in accordance with the Rules of Golf by being formed to a diameter of not less than 42.67 mm and a weight of not more than 45.93 g. It is recommended that the upper limit of the diameter be preferably not more than 44.0 mm, more preferably not more than 43.5 mm, and most preferably not more than 43.0 mm, and that the lower limit of the weight be preferably not less than 44.5 g, more preferably not less than 45.0 g, even more preferably not less than 45.1 g, and most preferably not less than 45.2 g.

The hot-molded material prepared from the inventive rubber composition for golf balls has a good resilience and excellent durability. By employing this as a one-piece golf ball material or as the solid core material in a multilayer solid golf ball, there can be obtained advantageous golf balls which have a higher initial velocity and increased carry, which prevent to the degree possible cracking from repeated impact, and which dramatically enhance durability.

EXAMPLES

The following examples and comparative examples are provided by way of illustration and not by way of limitation.

Examples 1 and 2, Comparative Examples 1 and 2

Rubber compositions formulated as shown in Table 1 were prepared, worked in a kneader or roll mill, then molded under applied heat and vulcanized under specific conditions to form one-piece golf balls having 396 dimples on the surface. The surfaces of the molded balls were coated with white paint and clear paint by a conventional method.

TABLE 1

|  |  | Example | | Comparative Example | |
|---|---|---|---|---|---|
|  |  | 1 | 2 | 1 | 2 |
| cis-1,4-Polybutadiene | | 95 | 95 | 95 | 95 |
| Polyisoprene | | 5 | 5 | 5 | 5 |
| Zinc acrylate | | 38.5 | 38.5 | 38.5 | 38.5 |
| Zinc oxide | | 10.00 | 14.10 | 11.55 | 14.10 |
| Zinc stearate | | 5 | 5 | 5 | 5 |
| Zinc salt of pentachlorothiophenol | | 1.5 | 1.5 | 1.5 | 1.5 |
| Sulfur | | 0.1 | 0.1 | 0.1 | 0.1 |
| 1,1-Bis(tert-butylperoxy)cylohexane, 40% dilution | | 3 | 3 | 3 | 3 |
| Polyolefin/polyamide binary copolymer (1) | | 3 | 0 | 0 | 0 |
| Polyolefin/polyamide binary copolymer (2) | | 0 | 3 | 0 | 0 |
| Rubber/polyolefin/polyamide ternary copolymer | | 0 | 0 | 0 | 3 |
| Vulcanization conditions | Temperature (° C.) | 160 | 160 | 160 | 160 |
| | Time (min) | 13 | 13 | 13 | 13 |

Note:
Numbers in table represent parts by weight

Trade names for most of the primary materials in the table are given below.

1,4-cis-Polybutadiene: BR730, produced by JSR Corporation
Polyisoprene: IR2200, produced by JSR Corporation
Zinc acrylate: 85S, produced by Nihon Jyoryu Kogyo Co., Ltd.
Zinc oxide: produced by Sakai Chemical Industry Co., Ltd.
Zinc stearate: Produced by NOF Corporation
Sulfur powder: Sulfur Z, produced by Tsurumi Chemical Industry Co., Ltd.
1,1-Bis(t-butylperoxy)cyclohexane, 40% dilution: Perhexa C-40, produced by NOF Corporation
Polyolefin/polyamide binary copolymer (1): LA0010, produced by Daiwa Polymer KK; polyolefin (low-density polyethylene)/polyamide (nylon 6) weight ratio=50/50
Polyolefin/polyamide binary copolymer (2): polyolefin (low-density polyethylene)/polyamide (nylon 6) weight ratio=80/20
Rubber/polyolefin/polyamide ternary copolymer: LA 1060, produced by Daiwa Polymer KK The deflection under a 980 N (100 kg) load by the resulting materials molded under heat from the rubber compositions was determined. Also the initial velocity and durability were determined as described below. The results are shown in Table 2.

Initial Velocity

The initial velocity was measured using an initial velocity measuring apparatus of the same type as the USGA drum rotation-type initial velocity measuring instrument approved by the R&A. The balls were temperature conditioned at a temperature of 23±1° C. for at least 3 hours, then tested in a room at a room temperature of 23±2° C. Each ball was hit with a 250 pound (113.4 kg) head (striking mass) at an impact velocity of 143.8 ft/s (43.83 m/s). One dozen balls were hit four times each and the time taken by the ball to travel 6.28 ft (1.91 m) after impact was measured, based on which the initial velocity was calculated. This test was carried out at a cycle time of about 15 minutes. The results are show on in Table 2.

Durability Test

One-piece golf balls were fabricated from the resulting hot-molded rubber compositions. The durability of each one-piece golf ball was evaluated using an ADC Ball COR Durability Tester produced by Automated Design Corporation (U.S.). This tester has the ability to fire a golf ball using air pressure and cause it to repeatedly strike two metal plates arranged in parallel. The number of firings needed until a ball cracks was treated as the indicator of durability. The results are shown in Table 2.

Velocity of impact with metal plate: 34 m/s
Number of runs (N): 7
Type: Horizontal COR

TABLE 2

|  |  | Example | | Comparative Example | |
|---|---|---|---|---|---|
|  |  | 1 | 2 | 1 | 2 |
| Ball properties | Ball diameter (mm) | 42.70 | 42.70 | 42.70 | 42.70 |
|  | Weight (g) | 45.80 | 45.80 | 45.80 | 45.80 |
|  | Deflection with 980 N loading (mm) | 2.82 | 2.86 | 3.01 | 2.83 |
|  | Initial velocity (m/s) | 76.93 | 76.90 | 77.00 | 77.03 |
|  | Durability test | 279 | 272 | 234 | 254 |

As is apparent from the results in Table 2, the golf balls according to the invention (Examples 1 and 2) had a much better durability than prior-art golf balls (Comparative Examples 1 and 2).

The invention claimed is:

1. A rubber composition for a one-piece golf ball or for a solid core of a solid golf ball having a multilayer construction in which the core is enclosed directly, or with an intermediate layer, by a cover, which rubber composition is characterized by comprising:

(a) 100 parts by weight of a base rubber,
(b) 10 to 60 parts by weight of a co-crosslinking agent,
(c) 5 to 80 parts by weight of an inorganic filler,
(d) 0.1 to 5 parts by weight of an organic peroxide,
(e) 0.05 to 5 parts by weight of an organosulfur compound,
(f) 0.05 to 5 parts by weight of sulfur, and
(g) 1 to 10 parts by weight of a binary copolymer consisting of a polyolefin component and a polyamide component.

2. The golf ball rubber composition of claim 1, wherein component (g) has a polyolefin component/polyamide component weight ratio of 25/75 to 95/5.

3. A one-piece golf ball characterized by being molded from the rubber composition of claim 1.

4. A solid golf ball having a multilayer construction comprising a solid core enclosed directly, or with an intermediate layer, by a cover, which multilayer solid golf ball is characterized in that the solid core is made of the rubber composition of claim 1.

5. The golf ball rubber composition of claim 1, wherein the polyolefin component in component (g) is selected from a group consisting of low-density polyethylene (LDPE), high-density polyethylene (HDPE), polypropylene and polystyrene.

6. The golf ball rubber composition of claim 1, wherein the polyamide component in component (g) is selected from a group consisting of nylon 6, nylon 66, nylon 11, nylon 12, nylon 610, nylon 612, copolymeric nylon, nylon MXD6, nylon 46, aramids, polyamide-imides and polyimides.

7. The golf ball rubber composition of claim 1, wherein the polyamide component in component (g) is nylon fibers having an average diameter of 10 μm or less.

8. The golf ball rubber composition of claim 1, wherein the component (g) is a form in which a crystalline polyolefin component is bonded to the surface of the nylon fibers by graft bonding.

9. The golf ball rubber composition of claim 1, wherein component (g) has a polyolefin component/polyamide component weight ratio of 30/70 to 90/10.

* * * * *